INVENTOR
KONRAD RAUSCH
BY
ATTORNEY.

United States Patent Office 3,424,003
Patented Jan. 28, 1969

3,424,003
APPARATUS FOR MEASURING THE LIQUID LEVEL IN A CONTAINER
Konrad Rausch, Hanau am Main, Germany, assignor to VDO Tachometer Werke Adolf Schindling GmbH., Frankfurt am Main, Germany, a corporation of Germany
Filed Nov. 28, 1966, Ser. No. 597,267
Claims priority, application Germany, Dec. 2, 1965, V 29,837; Apr. 1, 1966, V 30,775
U.S. Cl. 73—302
Int. Cl. G01f 23/16
7 Claims

ABSTRACT OF THE DISCLOSURE

An apparatus for measuring the liquid level in a container which comprises a container having an opening and a bottom wall as well as additional walls and defining a tubular air chamber therein. A pressure gauge is operatively connected with the air chamber. The latter is in communication with the liquid in the vicinity of the bottom of the container. Suction means including a suction conduit are provided for withdrawing the liquid from the container. An air conduit communicates with the suction conduit, so that a part of the removed liquid with simultaneous entraining of air is returned to the container liquid in the air chamber. A closing member is provided for the container opening. Means for securing the air chamber to said closing member are arranged and a connecting conduit extends through the closing member. A discharge nozzle is disposed in the closing member for build-up of pressure in the air chamber corresponding with the level of the liquid in the container. A tube branch is sealingly connected with the closing member and receives one end of the discharge nozzle and a liquid conduit connects the suction means with the discharge nozzle, and the liquid conduit and the air conduit lead separately to the discharge nozzle.

---

The present invention relates to an apparatus for measuring the liquid level in a container with an air chamber disposed in the liquid, connected with a pressure gauge and communicating in the vicinity of the container bottom with the liquid, in particular for the content measuring of tanks of automotive vehicles, whereby the liquid is sucked up from the container by means of a pump and one part of this sucked-off liquid is re-fed again to the liquid in the container in the air chamber by means of the pump with simultaneous feeding of air from an air conduit which is in communication with the suction conduit.

It has been proposed before to provide devices for liquid level measuring. In the conventional devices, the build-up of the pressure in the air chamber corresponding to the level of liquid in the container takes place always in such manner, that a connecting conduit is connected as a rule in the vicinity of the container bottom with air or the space above the liquid in the container. Upon entering of the liquid in the suction conduit after starting the operation of the device, at first, the liquid standing in the air conduit is sucked up and air is then entrained in the flow by the continuous liquid stream. This air-liquid flows through the suction pump, behind which, by means of a thin return conduit, one part is fed back into the container liquid in the air chamber by the pump pressure. By this joined air, a pressure above atmospheric pressure is built up in the air chamber, until the hydrostatic pressure created by the lowering of the liquid level corresponds with the level of the liquid in the container. The air fed further thereto enters in form of bubbles through the bottom openings of the air chamber and through the container liquid again into the space above the same.

The device referred to above, has the drawback that from the air entrained in the suction conduit, only a small part reaches the air chamber by means of the return conduit corresponding to the small part of returned liquid and the pressure necessary for the level measuring is built up only slowly upon starting the operation. The known devices are, furthermore, suitable exclusively for the incorporation into the container top and due to the necessary wall penetrations by tube conduits, which must be well sealed off, are also relatively spaceous.

It is one object of the present invention to provide an apparatus for measuring the liquid level in a container, which avoids the drawbacks of the known devices and wherein in the first place an embodiment is provided, which is suitable for container shapes, in which the upper part is set off laterally from the lower part of the container such, that an incorporation of the measuring device into the container top above the highest liquid level in the container is impossible, the measuring device extending into the vicinity of the container bottom.

It is another object of the present invention to provide an apparatus for the measuring of liquid levels in a container, wherein the build-up of the pressure in the air chamber corresponding to the liquid level of the liquid in the container is brought about by a discharge nozzle, which is built-in into the return line of the liquid from the suction pump and to which the air conduit is fed.

It is still another object of the present invention to provide an apparatus for the measuring of liquid level in a container, wherein for the insertion of the apparatus in the container bottom a solution is provided such, that the air chamber is formed as a tube with a closing member for the container opening insertable into the bottom of the container and in the closing member are disposed the discharge nozzle terminating in the air chamber, as well as the feed lines to the latter for the liquid recycle run from the suction pump and for the air conduit. For the suitable formation of the device to a unitary transmitter, the connection for the capillary shaped connecting conduit between the air chamber and the pressure gauge is also provided in the closure member, whereby the connecting conduit in the air chamber terminates into a tube secured to the closing member and extending nearly to the upper edge of the air chamber, and the air chamber is tightly sealed inside of the container except for the openings near the bottom. The height of the air chamber can be smaller, even appreciably smaller than the maximum level height of the liquid in the container. Its volume must be, however, by all means larger than the volume of the connection conduit to the pressure gauge including its pressure chamber, in case of an insertion of the device at the lowermost point of the container bottom. In order to avoid a soiling of the discharge nozzle, it is also of advantage, to provide a tube about the mount of the nozzle in the air chamber, which tube is sealingly connected with the closure member and the volume of which is larger than that of the air conduit. The discharge nozzle can be designed as a double nozzle, whereby in the intermediate space between the nozzles the air conduit terminates.

For container shapes, in which the lowermost point of the container bottom is not accessible for the insertion of the device, which container shapes, have, however, for the lowermost bottom portion of the container favorably disposed insertion places on a side wall part or a top wall part, it is provided, in accordance with the present invention, to form the air chamber as an intermediate space of two tubes disposed within each other and extending to the vicinity of the lowermost point of the container bottom and insertable into a side wall part or top wall part of the container, the tubes being equipped with a closing member containing the discharge nozzle for the container opening, whereby the discharge or spray nozzle terminates in the inner tube and the connecting conduit for the pressure gauge is guided through the closing member. In case of an insertion of the measuring device at such point, the connecting conduits can be arranged, as a rule, more favorably, than in case of an insertion of the device in the container bottom.

In order to prevent a penetration of the liquid into the air filled connecting conduit of the pressure gauge upon particularly strong cooling after filling of the empty container and prior to the first operation of the suction pump, the volume of the air chamber should be larger than that of the connecting conduit to the pressure gauge including the pressure chamber of the latter. If, in case of a particularly extreme container shape, however, only one wall position is available at a lower level above the container bottom for the insertion of the device, and if, thereby, a volume of the air chamber results, which is too small in relation to the volume of the connecting conduit and the pressure gauge, so that in case of particularly unfavorable temperature variations liquid could penetrate into the connecting conduit, then, under circumstances, the liquid would not move out again and thereby falsify the measuring. In order to render the device also available for such extreme situation, the present invention provides further to design the connecting conduit for the pressure gauge from its mouth into the air chamber over a predetermined minimum length as communicating double tube, and, thereby, to secure the emerging of liquid penetrated into the connecting conduit by the suction lifting effect of the communicating double tube. The connecting conduit must be formed from its mouth into the air chamber as a double conduit for a length and the communicating point must be at least so high above the mouth of the conduit, in consideration of the fact that liquid can penetrate into the conduit under most unfavorable circumstances. A further inexactness of the indication of the pressure gauge can occur, if a pressure difference occurs in the air chamber above the container liquid and in the air space about the pressure measuring member in the housing of the pressure gauge. Such pressure difference can occur, for instance, in an automotive vehicle at great speeds by the suction effect of the travelling wind or also by an air conditioning blower. For elimination of such indication error, which can be appreciable under circumstances, in view of the low measuring pressures of the device, in accordance with the present invention, it is further proposed to connect together the air conduit, which is in communication with the air space above the container liquid, and the air space about the pressure measuring member in the housing of the pressure gauge by means of a conduit and, thereby, to assure a pressure balance and the avoidance of a wrong indication.

With these and other objects in view which will become apparent in the following detailed description, the present invention will be clearly understood in connection with the accompanying drawings, in which.

Figure 1:
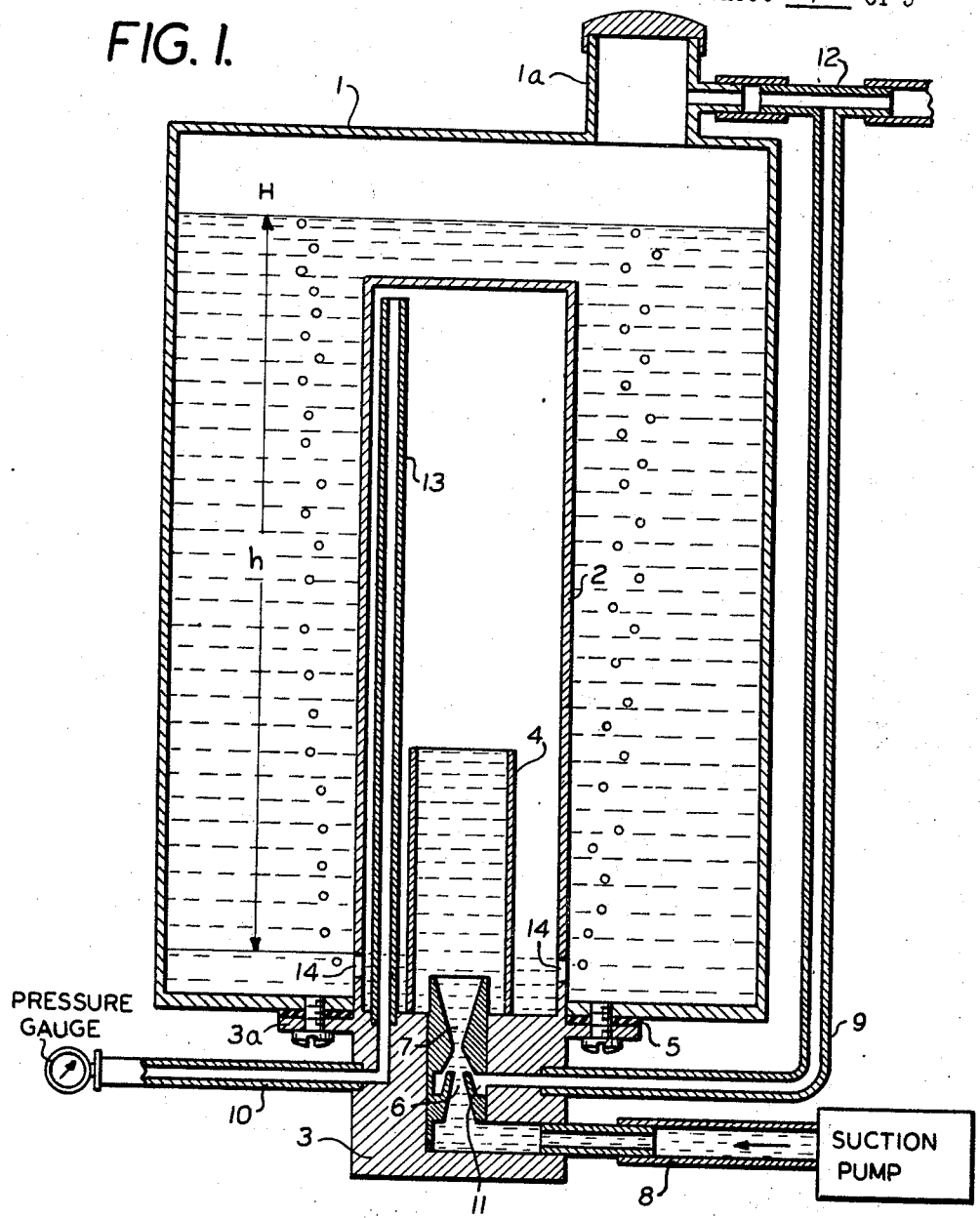
FIGURE 1 is a measuring device disposed in the bottom of the container, whereby it is assumed that an insertion into a top- or side-wall part of the container is not possible.

Referring now to the drawings, and in particular to FIG. 1, the apparatus comprises a liquid container 1 having a filling branch 1a in the cover and having further an opening in the container bottom, into which can be inserted from below a closed tube 2 into the container 1. The tube 2 is mounted on a closing member 3 and defines an all around closed air chamber of the measuring device with the exception of openings 14 adjacent the bottom of the container 1. By a screw connection, for instance, of the securing flange 3a on the closing member 3 or other suitable securing means, the air chamber 2 can be connected with the container bottom rigidly and sealingly by intermediate means of a seal 5. A double discharge nozzle 6 and 7 is arranged in the closure member 3, as well as the feed channels and the flange connections for a liquid conduit 8 and for an air conduit 9. The liquid conduit 8 is connected with the output of the suction pump (not shown) and terminates in the nozzle 6, while the air conduit 9 is connected with the bleeding tube 12 from the filling branch 1a and terminates into an intermediate space 11 between the nozzles 6 and 7. In the closure member 3 is furthermore also a branch for a connecting conduit 10 of the air chamber 2 with the pressure gauge. Inside of the air chamber 2 the connecting conduit 10 is sealingly connected with a tube 13 which extends nearly to the upper closure of the air chamber 2. the height of the air chamber 2 is smaller than the maximum level H of the liquid in the container 1. Its volume must be larger, however, than the volume of the tube 13, of the connecting conduit 10 and of the pressure chamber in the pressure gauge, in order to exclude safely the penetration of liquid into the tube 13 upon the occurrence of maximum cooling. A tube branch 4 is also arranged about the mouth of the discharge nozzle 7 in the air chamber 2 and sealingly connected with the closure member 3, the volume of the latter being greater than that of the air conduit 9, in order that the mouth of the discharge nozzle is disposed always below the liquid level.

If now liquid is filled into the container 1 through the filling branch 1a, liquid flows through openings 14, also into the air chamber 2 and rises in the latter at first up to the upper edge of the tube branch 4, since the air present in the air chamber 2 can escape to the outside through the tube branch 4 by means of the discharge nozzle 7 and the air conduit 9. Upon further filling of liquid, the latter flows also into the tube branch 4, as well as over the discharge nozzle 7 into the air conduit 9 and closes the inner space of the air chamber 2 relative to the outside air, so that, upon further filling, air pressure above atmospheric pressure is built up in the air chamber and in the spaces of the tube 13 connected with the air chamber 2, as well as in the connecting conduit 10 to the pressure gauge, which pressure above atmospheric pressure prevents, that the liquid level in the air chamber 2 rises up to its upper end. In the air conduit 9, the liquid level rises, however, about up to the height of the liquid level inside of the container until the hydrostatic pressure of the liquid holds the balance with the pressure above atmospheric pressure in the air chamber 2. The pressure gauge shows at first a pressure above atmospheric pressure which corresponds to the level difference between the liquid level in the container 1 and in the air chamber 2.

As soon as the suction pump (not shown) is put into operation, a small part of liquid fed by the suction pump flows back through the return conduit 8 and through the nozzles 6 and 7 into the air chamber 2, whereby a pressure below atmospheric pressure is created in the annular intermediate chamber 11 between the nozzles 6 and 7, through which pressure below atmospheric pressure at first the liquid standing in the air conduit 9 and later air is entrained in the tube branch 4. While the liquid returning into the air chamber 2 can flow through the openings 14 into the container 1, the sucked-off air is collected in the air chamber 2 and increases the pressure above atmospheric pressure in the latter and in the chambers connected therewith, whereby the liquid level is lowered in the air chamber 2 down to the openings 14. Additional air fed from the discharge nozzle into the air chamber 2 does not increase the pressure above atmospheric pressure, since it returns as recycled liquid through the openings 14 into the container 1 and moves upwardly in the liquid in form of air bubbles. The pressure above atmospheric pressure, built up in the air chamber 2, in the tube 13 and in the connecting conduit 10, as well as in the pressure gauge, is equal to the hydrostatic pressure of the liquid at the openings 14 of the air chamber 2, which pressure is proportional to the height $h$ of the liquid level above the openings 14. The pressure indicated by the pressure gauge is a measure for the filling status in the container 1 and can be gauged in volume units corresponding to the shape of the container.

If the suction pump is shut off again, the flow of the liquid through the discharge spray nozzles 6 and 7 is terminated. Liquid flows from the tube branch 4 through the discharge nozzle 7 and the intermediate space 11 into the air conduit 9 up to about the height of the liquid level in the container 1, until the hydrostatic pressure of the liquid in the air conduit 9 balances the pressure above atmospheric pressure in the air chamber 2. The indication of the pressure gauge falls down only slightly, because the volume of the air conduit 9 is very small relative to that of the air chamber 2 and the spaces connected therewith. The volume of the tube branch 4 is larger than that of the air conduit 9, so that always a liquid residue remains in the tube branch 4. The height of the tube branch 4 can be so large, that the level of the liquid flowing through the openings 14 in the space between the air chamber 2 and the tube branch 4, due to reduction of the pressure above atmospheric pressure by strong cooling, remains always below its upper open end. By this arrangement, a soiling of the nozzle bores by contaminations collected possibly at the container bottom is avoided.

If the suction pump is put again into operation, a pressure above atmospheric pressure corresponding to the hydrostatic pressure of the liquid, is built up again in the air chamber 2, whereby the possibly raised liquid level is lowered again to the level of the openings 14 and liquid which has penetrated before into the space between the air chamber 2 and the tube branch 4 or contaminations are again returned into the container 1.

Figure 2:
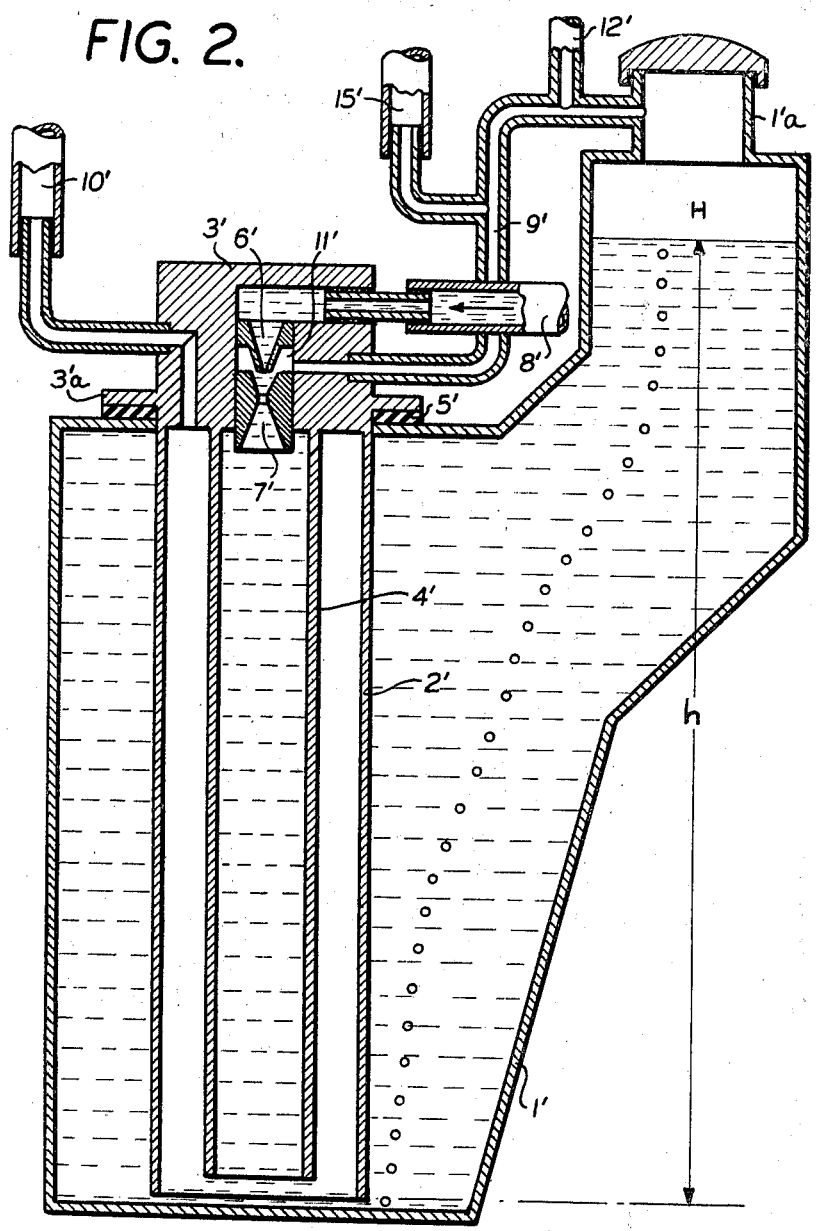
FIG. 2 is a vertical section of a measuring device built into a top wall part of the container, which is disposed below the highest liquid level and above the lowermost bottom point.

In case of an irregularly designed container 1', as indicated in FIG. 2, the upper part with the filling branch 1'a is set off against the lower disposed container part and is also formed so narrow such, that an insertion of a measuring device in the container top above the highest possible liquid level is not possible. In a lower disposed part of the container top above the lowermost body part an opening is provided, in which a tube 2' open at its bottom is inserted into the container 1', which tube 2' extends nearly to the container bottom. The tube 2' and within the tube 2', a further only slightly shorter tube 4' are sealingly secured to a closure member 3' for the container openings. The intermediate space between the tubes 2' and 4' defines the air chamber of the measuring device which is closed up from below by the liquid. The closure member 3' with all connecting conduits and parts 5', 6', 7', 8', 9', 10', 11' and 12' are the same as disclosed in the embodiment of FIG. 1.

If liquid is filled in the empty container 1', the liquid flows through the opening between the ends of the tubes and the container bottom into the tube 4' and into the air chamber between the tubes 2' and 4' and rises by means of the tube 4' through the nozzles 6' and 7' into the air conduit 9' to the same level as set in the container 1'. The liquid rises, however, in the air chamber between the tubes 2' and 4', until the pressure in the air chamber and in the conduit 10', as well as in the pressure gauge (not shown) equals the hydrostatic pressure of the liquid in the container 1'. The pressure gauge shows the pressure above atmospheric pressure, which corresponds with the level difference between the liquid level in the container 1' and that in the air chamber.

Upon starting operation of the suction pump, the function is the same as in the embodiment disclosed in connection with FIG. 1. The liquid returned through the discharge nozzles 6' and 7' and entraining air is pressed into the tube 4'. While the liquid can flow out through the slot between the lower end of the tube 2' and the container bottom into the container 1', the air simultaneously entrained is collected in the air chamber between the tubes 2' and 4' and increases the pressure above atmospheric pressure in the latter and in the chambers connected therewith, whereby the liquid level in the air chamber is lowered to the end of the tube 2'. Additional air fed by the spray nozzles 6' and 7' moves likewise in form of bubbles through the opening between the tube 2' and the container bottom into the space above the liquid in upward direction. The pressure above atmospheric pressure built up in the air chamber and in the pressure gauge equals the hydrostatic pressure of the liquid proportional to the height $h$ of the liquid level above the end of the tube 2'.

If the suction pump is shut off, the liquid flows through the tube 4' and the discharge nozzle 7' into the air conduit 9' up to the level H of the liquid level in the container 1'. The indication of the pressure gauge is lowered for this reason slightly and much less as in the embodiment disclosed in FIG. 1. Correspondingly, upon resuming the operation of the suction pump, the exact indication is restored very fast.

In order to avoid a measuring error due to the occurrence of pressure differences in the air space above the container liquid and the air space about the measuring member (for instance a manometer box) of the pressure gauge, the air conduit 9' can be connected by means of an equalization conduit 15' with the air space in the housing of the pressure gauge.

Figure 3:
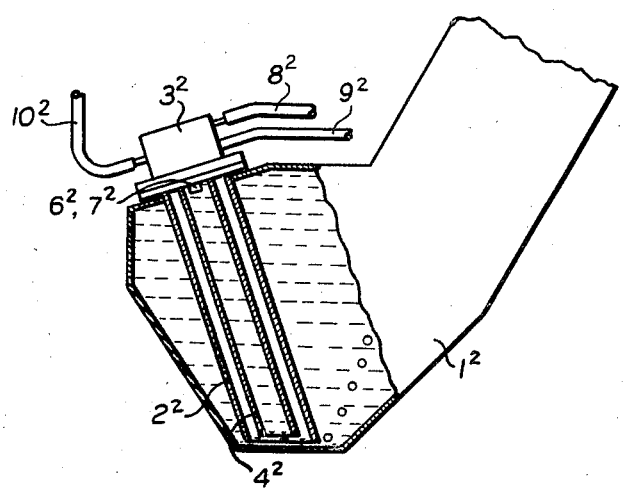
FIG. 3 is a schematic elevation, partly in section, of another embodiment fitting into an oblique wall portion.

The measuring device can also be arranged at an oblique wall portion and in oblique position in the container, if the container and the insertion of the container, for instance, into an automotive vehicle, requires such arrangement, as indicated in FIG. 3 of the drawings.

Figure 4:
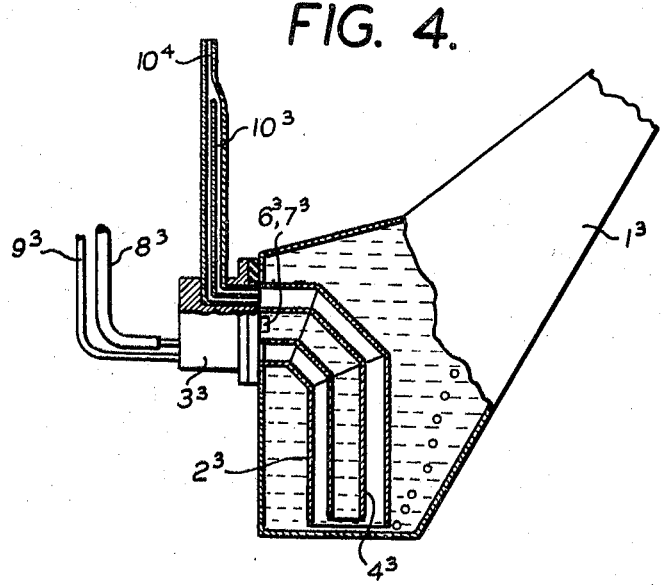
FIG. 4 is a schematic elevation, partly in section, indicating the insertion at a lower level above the container bottom with a communicating double conduit for the connection of the pressure gauge.

It is a presumption for such design not only that the apparatus extends with its open tube ends $2^2$ and $4^2$ into the vicinity of the lowermost part of the container bottom. The function of the measuring device is not interfered with by the inclined insertion. If, due to a particularly extreme container shape or in view of the insertion conditions of the container, or for some other suitable reasons, an insertion of the apparatus at a wall point of low height above the container bottom is required and thereby only a relatively small air chamber of the measuring device results, a penetration of liquid into the connecting conduit $10^2$ to the pressure gauge cannot be avoided any more under certain circumstances. In order to secure a flowing out of the liquid from the conduit $10^2$ upon starting operation of the suction pump, this conduit, as shown schematically in FIG. 4, is designed as a communicating double tube $10^3$ from its termination into the air chamber over a predetermined minimum length and is designed as a single connecting conduit $10^4$ only from the communication point. The double conduit $10^3$ must be so long that liquid can penetrate into this conduit under the most unfavorable circumstances, and the communication point is disposed higher than its termination into the air chamber. The air collecting at the mouth of the double conduit $10^3$ upon starting the suction pump can penetrate thereby by all means in one of the conduit branches, while, from the other conduit branch, the corresponding liquid quantity runs out until one conduit branch is free from liquid. Then the other conduit branch is also emptied. Even, if theoretically the liquid columns in the conduit branches are fully equal, already the joltings assure a discharge of the liquid. By an arrangement of the terminal points of the two conduit branches of the communicating double tube at a slightly different height, the liquid columns penetrating into the double conduit can be made unequal from the start.

If a greater drop of the indication of the pressure gauge is taken in stride, upon shutting off the suction pump, then upon using a communicating double conduit $10^3$ for the connection of the pressure gauge, the inner tube $4^3$ can be eliminated and the air chamber can be made very small, the apparatus can also be built-in into a side wall part of the container just slightly above the container body.

The other elements shown in FIGS. 3 and 4 bear the same numerals with index 2 and 3, respectively.

The apparatus designed in accordance with the present invention makes it possible to obtain a correct level indication very quickly at each start of the operation of the suction pump. Due to the tubular formation of the air chamber and its design on a closure member, in which also all feeding and escape conduits of the measuring device are built in, the apparatus is particularly suitable for a fuel level indicator in connection with very complicated tank shapes, as they are used to an increasing extent for the exploitation of dead spaces in the chassis of automotive vehicles.

I claim:
1. An apparatus for measuring the liquid level in a container comprising
   a container having an opening and a bottom wall as well as additional walls and defining a tubular air chamber therein,
   a pressure gauge opeeratively connected with said air chamber,
   said air chamber being in communication with said liquid in the vicinity of the bottom of said container,
   suction means including a suction conduit for withdrawing said liquid from said container,
   an air conduit communicating with said suction conduit, so that a part of said removed liquid with simultaneous entraining of air is returned to said container liquid in said air chamber,
   a closing member for said container opening,
   means for securing said air chamber to said closing member,
   a connecting conduit extending through said closing member,
   a discharge nozzle disposed in said closing member for build-up of pressure in said air chamber corresponding with the level of said liquid in said container,
   a tube branch sealingly connected with said closing member and receiving one end of said discharge nozzle,
   a liquid conduit connecting said suction means with said discharge nozzle, and
   said liquid conduit and said air conduit leading separately to said discharge nozzle.
2. The apparatus, as set forth in claim 1, wherein
   said air chamber has openings and is closed except said openings,
   the volume of said tube branch is larger than the volume of said air conduit from said discharge nozzle up to the maximum height of the liquid level,
   said connecting conduit terminates into a tube open at one end and disposed in said air chamber, as well as sealingly connected with said closing member, and
   said tube extending at said open end up to the upper end of said air chamber, said apparatus being inserted in an opening of said bottom wall of said container.
3. The apparatus, as set forth in claim 1, wherein
   said tube branch and said air chamber extends up to the vicinity of the lowest point of said container bottom, said apparatus being inserted in an opening of said top wall or of said side wall of said container.
4. The apparatus, as set forth in claim 3, wherein
   said connecting conduit from its termination into said air chamber comprises a communicating double tube for a predetermined minimum length.
5. The apparatus, as set forth in claim 1, wherein
   one of said additional walls is a top wall.
6. The apparatus, as set forth in claim 1, wherein
   one of said additional walls is a side wall.
7. The apparatus, as set forth in claim 1, wherein
   the height of said air chamber is smaller than the maximum liquid level in said container.

References Cited

UNITED STATES PATENTS 3,262,313   7/1966   Hanna _____ 73—302

FOREIGN PATENTS 1,166,720   6/1958   France.

LOUIS R. PRINCE, *Primary Examiner*

D. O. WOODIEL, *Assistant Examiner.*